(12) United States Patent
Lin et al.

(10) Patent No.: US 8,949,978 B1
(45) Date of Patent: Feb. 3, 2015

(54) EFFICIENT WEB THREAT PROTECTION

(75) Inventors: Ssu-Yuan Lin, Yingge Township (TW); Tzun-Liang Wang, Sanchong (TW)

(73) Assignee: Trend Micro Inc., Tokyo (JP)

( * ) Notice: Subject to any disclaimer, the term of this patent is extended or adjusted under 35 U.S.C. 154(b) by 1190 days.

(21) Appl. No.: 12/683,066

(22) Filed: Jan. 6, 2010

(51) Int. Cl.
*G06F 11/00* (2006.01)

(52) U.S. Cl.
USPC .............. 726/22; 726/12; 726/23; 726/24; 726/25; 726/26

(58) Field of Classification Search
USPC .............. 726/12, 22, 23, 24, 25, 26
See application file for complete search history.

(56) References Cited

U.S. PATENT DOCUMENTS

| | | | |
|---|---|---|---|
| 6,611,925 B1* | 8/2003 | Spear | 714/38.14 |
| 7,634,543 B1* | 12/2009 | Van Zant et al. | 709/206 |
| 7,818,343 B1* | 10/2010 | Sekhar et al. | 707/781 |
| 8,561,182 B2* | 10/2013 | Lee | 726/22 |
| 2010/0057631 A1* | 3/2010 | Warner | 705/318 |
| 2010/0083380 A1* | 4/2010 | Harris et al. | 726/24 |
| 2011/0078309 A1* | 3/2011 | Bloch et al. | 709/224 |

* cited by examiner

*Primary Examiner* — Mohammad A Siddiqi
(74) *Attorney, Agent, or Firm* — Beyer Law Group LLP

(57) ABSTRACT

A computing device in a network is protected from malware originating from Web sites, referred to as Web threats, by having only one domain reputation database check performed before a URL is sent to a target Web site. The computing device performs a URL check using an external reputation database and generates a pass token if the URL is considered safe. The pass token is inserted into the header of the HTTP request containing the URL. When the gateway device in the network (the device that receives HTTP requests in the network and transmits them over the Internet) receives the HTTP request, it validates the pass token and allows the request to proceed to the target Web site without having to perform its own URL check using the same reputation database. Instead, it can rely on the pass token and assume that the URL will not pose a potential Web threat.

21 Claims, 7 Drawing Sheets

End-Point Device

End-Point Device

End-Point Server Registration

EFFICIENT WEB THREAT PROTECTION

BACKGROUND OF THE INVENTION

1. Field of the Invention

The present invention relates generally to computing devices and software for malware protection. More specifically, it relates to protecting computing devices against malware threats from Web sites using a domain reputation database.

2. Description of the Related Art

Internet users are increasingly going to more and more Web sites for information, entertainment, and general "surfing." Social networking sites have become very popular. Such sites provide diverse opportunities to interact with other users, but with such interactivity also comes increased risks of entering potentially harmful Web sites.

Hackers have come to realize that an efficient way to get their malware onto users' computers is to do so when users visit Web sites or more specifically when users go to specific pages of a site identified by a uniform resource locator (URL). This can lead to severe damage on the user's computer and the user's network, and can also lead to information leakage and identity theft. Web threat protection enables users to prevent unintentionally downloading or otherwise importing malware from Web sites. One way to implement Web threat protection is to prevent users from visiting potentially malicious Web sites. This may be done by utilizing Web Reputation technology. This technology involves domain reputation databases maintained by an anti-virus and Internet security service provider, such as TrendMicro, Inc. of Cupertino, Calif. These databases contain domain reputation histories for Web sites. The reputation database maintained by TrendMicro, for example, has data on 300 million domains and is continually growing.

An end user having Web threat protection is able to have URLs checked before the user is allowed to access the corresponding target Web site. The reputation of the URL is determined and, if above a certain threshold or score, access is granted to the user to visit the URL. If not, access to the site is simply blocked or the user is notified and provided with options. Not surprisingly, a domain reputation database may get search requests at a very high frequency, and traffic to and from the database (which is accessed over the Internet) is so high that there is often a latency in the time the user clicks on a link or types in a URL in a browser and the time she is allowed (or denied) access to the site. Each time a user wants to visit a Web site or URL, the database must be checked to determine the reputation of the site.

In current methodologies, the domain reputation database is checked twice for the same URL, leading to higher latency times and increasingly busy network traffic. In one scenario, end-point security software on a client computer in a network filters an HTTP request (that the client wants to send) to obtain a URL in the request. The URL is sent to the domain reputation database, which may be operated by an anti-virus service provider, to obtain information regarding to the URL. The database is searched using the URL and, if found, a rating or score is sent back to the client computer. If the rating is sufficiently high indicating that the Web site is considered safe, the security software on the client computer allows the HTTP request to be transmitted.

However, because the client is in a network, another device processes the request before it is transmitted on the Internet to the target Web site. The request is received by a gateway device in the network before it is forwarded. The gateway device, also having the same or similar security software as the client (supplied by the same service provider), performs a Web site reputation check on the URL in the same manner as the client computer. That is, a query is made to the same domain reputation databases using the same URL. This is because when it receives the HTTP request from the client computer, the gateway device does not know if a domain reputation check has already been done by the client or, if done, what the URL score was.

A rating is returned to the gateway and, if acceptable, the HTTP request is allowed to proceed to the Web site or it is dropped if the score is below a threshold. Thus, in this context, two queries are made to the reputation database with the same URL. In some cases, an HTTP request may have multiple URLs, in which case a request is sent for each URL. These online queries to the databases add cost to the service provider, which has to maintain the database servers and ensure that the high volume of URL queries is satisfied as quickly as possible and to the network entity (e.g., company, school, agency, etc.) in terms of latency and network traffic. The latency for the user at the client computer gets longer as the network traffic grows. As noted, a domain reputation database may have rating data on upwards of 300 million Web sites and may get about 2 billion queries a day, not including the constant updating of the database with new ratings and changes.

Traditional, scan-based security solutions alone do not provide effective protection from Web threats. Most URL-filtering and content-inspection solutions only protect by reacting to known threats. These are not efficient or effective means for Web threat protection. To effectively combat new and emerging Web threats, new Web site-reputation based solutions that reduce latency and network traffic are needed.

SUMMARY OF THE INVENTION

A computing device in a network is protected from malware originating from Web sites, referred to as Web threats, by having only one domain reputation database check performed before a URL is sent to a target Web site. The computing device performs a URL check using an external reputation database and generates a pass token if the URL is considered safe. The pass token is inserted into the header of the HTTP request containing the URL. When the gateway device in the network (the device that receives HTTP requests and transmits them over the Internet) receives the HTTP request, it validates the pass token and allows the request to proceed to the target Web site without having to perform its own URL check using the same database. Instead, it can rely on the pass token and assume that the URL will not pose a potential Web threat.

In one embodiment, a computing device connected to a server and a gateway device in a network is protected against Web threats. On the computing device, a URL is identified in an HTTP request. A URL reputation data value is obtained by the device using an external domain (Web site) reputation database. It is then determined whether the reputation of the URL, as indicated by the reputation data value (score), indicates that the URL is safe. The computing device calculates a pass token utilizing a server name, the URL, and a server token resident on the computing device. In one embodiment, the pass token is generated by applying a hash function to the URL and the server token and combining the hash value with the server name. The pass token is then inserted into the HTTP request, thereby creating a modified HTTP request. The modified request is transmitted to a gateway device for transmission over the Internet to the target Web site.

In another embodiment, a client computer connected to a gateway device in a network is protected against Web threats. The gateway device receives an HTTP request having an original pass token from the client computer. The original pass token is filtered or obtained from the HTTP request. The gateway device creates a secondary or validation pass token and it is then determined whether the original pass token is valid. This is done by comparing the original pass token with the validation pass token. If the two pass tokens are the same, the gateway device transmits the HTTP request to the target Web site.

In another embodiment, a method of adding a new server to a network having a client computer and a gateway device where the network is capable of protecting the client computer against a Web threat is described. The gateway device receives a request for a token from the new server where the request contains a new server ID. The token is created on the gateway device using a gateway secret and the new server ID. The token is transmitted from the gateway device to the new server. The token is then transmitted to the client computer in the network, where the token is used to generate a pass token for insertion into an HTTP request when a URL reputation check has been performed.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Figure 1:
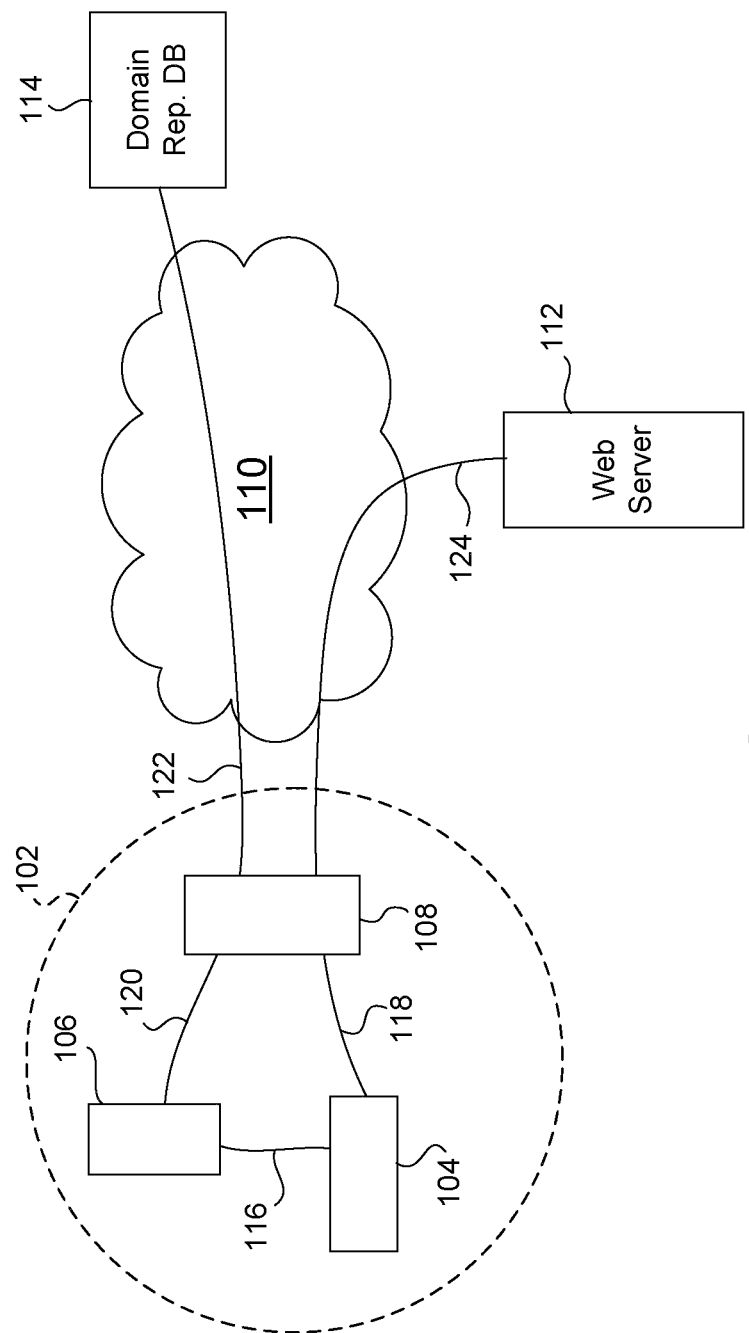
FIG. 1 is a network diagram showing components for protecting an end-point computer from Web threats in accordance with one embodiment.

The danger of a computer getting infected by malware by visiting Web sites is referred to as a Web threat. In the last several years, these types of threats have evolved to become more sophisticated and are increasingly taking advantage of the interactive nature of the Internet and are using multiple components to carry out their threats. They leverage the Web to update, hide, communicate, and transmit malware and stolen information. They are more pervasive today and are the fastest growing threat vector. Characterized by blended techniques, an increasing number of variants, and targeted and regional attacks, Web threats pose a broad range of potential dangers, including identity theft, data leakage, loss of intellectual property, damaged brand reputation, and loss of consumer confidence in Web commerce. Hackers are becoming more organized, shifting to the Web as their primary medium, and motivated by the degree to which the Web has become an intrinsic part of daily life for many computer users.

One of the predominant ways to protect a computer or network against Web threats is to check the reputation of a Web site before the computer is allowed to access it; that is, determine whether a site is safe or unsafe before the computer has any interaction with it. The type of technology used to check Web site reputations is referred to as Web reputation technology or Web threat protection technology. At the center of this technology is the Web site reputation database, also referred to in the art as a domain reputation database. These databases are often massive and, in order to provide the best Web threat protection, are continually growing, adding reputation data on new and existing Web sites.

Web threats often have the following common features: 1) using the Web to perform malicious and sometimes self-perpetuating activities; 2) consisting of one or more malicious programs that are installed on a computer without the user's knowledge, permission, or understanding when the user accesses the Internet; and 3) may either be invisible or appear benign to the user, but when activated individually or in combination can steal confidential information from the user's computer or use the computer's resources without the user's knowledge or permission. Examples of Web threats include: spyware installed upon visiting a Web site; a bot that receives commands via Internet Relay Chat (IRC) (a multi-user online chatting environment) or through Web pages; adware installed after downloading a program; a Trojan installed from a JPEG "exploit" upon visiting a Web site that was clicked from an e-mail received by the user; a virus spread from a program downloaded from the Internet; and a worm that blasts copies of itself after disguising itself as a downloaded widget for a particular application (e.g., online gaming).

Methods and systems for monitoring outbound Web site requests to protect computing devices against malware threats hosted on Web sites that have either been infiltrated or specially crafted to carry out such threats are described. The methods can be implemented as a lightweight client module that operates in conjunction with or within existing antivirus software. The client module is proactive and designed to intercept malicious threats before a Web page reaches and infects the end-point computing device. By intercepting these threats early, the need for conventional, resource-intensive threat scanning and clean-up on the end-point device is reduced. As described below, Web site URLs are checked using domain reputation databases. This Web site reputation checking is done "in-the-cloud" on databases maintained by antivirus service providers. This remote checking keeps the client and network servers from having to scan or perform other time-consuming analysis to protect against Web threats. The methods are performed at the end-point computing device, network server (connected to the device), a gateway device in the network, and, as noted, at domain reputation databases "in the cloud."

FIG. 1 is a network diagram showing components for protecting an end-point computer from Web threats in accordance with one embodiment. An internal or private network 102 includes an end-point computing device 104, an end-point server 106 and a gateway device 108. Internet 110 enables communication between gateway device 108 and a target Web site server 112 and a domain reputation database server 114. In another embodiment, end-point computing device 104 may be a stand-alone device that is not part of a private network and uses an Internet service provider (ISP) to access Internet 110. In this embodiment, components functioning as end-point server 106 and gateway device 108 are maintained and operated by the ISP and provide Web threat protection to end-point computer 104 (i.e., a customer of the ISP), as described below. In yet another embodiment, network 102 may be a small network, such as a home network, and end-point computer 104 and server 106 may be implemented on a single machine, each entity operating its own security software as explained below. In this embodiment, server 106 and computer 104 may be described as a server process and a client process, each executing on the same computer. Gateway device 108 may be a firewall process or a separate physical device in network 102 and processes many, if not all, Web site requests leaving network 102. For the purposes of the various embodiments, gateway device 108 and computer 104 need not communicate directly, but there may be a connection 118 between them for other functions. In either case, online requests from computer 104 will be captured by gateway device 108.

Various information is shared among these components during normal operation of the present Web threat protection system. Relevant information is also created and transferred when a new end-point server is added and registered in network 102. The exchange and processing of this information are described in detail in FIGS. 2 to 7 and so only an overview of the data transmitted among the components is provided here. In the situation where the Web threat protection processes are up and running (normal operation), the process begins with computer 104 making a request to go to a Web site via a browser. This request is typically an HTTP request. HTTP request is sent to domain reputation database 114 via Internet 110 without having to go through server 106. Connection 116 is only used when server 106 is initially connected to client 104 to get secret data, described below. Thus, HTTP request 116 will go from end-point computer 104 through connection 118 to gateway 108 (which will not parse it) and forward it to database 114 via Internet 110. A connection 120 between server 106 and gateway device 108 is used for transmitting a modified HTTP request to gateway device 108 and for receiving Web site pages (HTTP data) from device 108. A connection 122, via Internet 110, between gateway 108 and reputation database 114 is also for transmitting URL search requests and returning URL reputation data. A connection 124, via Internet 110, is used for transmitting the modified HTTP request to target Web server 112 and returning Web site pages (HTTP data) to gateway 108.

Figure 2:
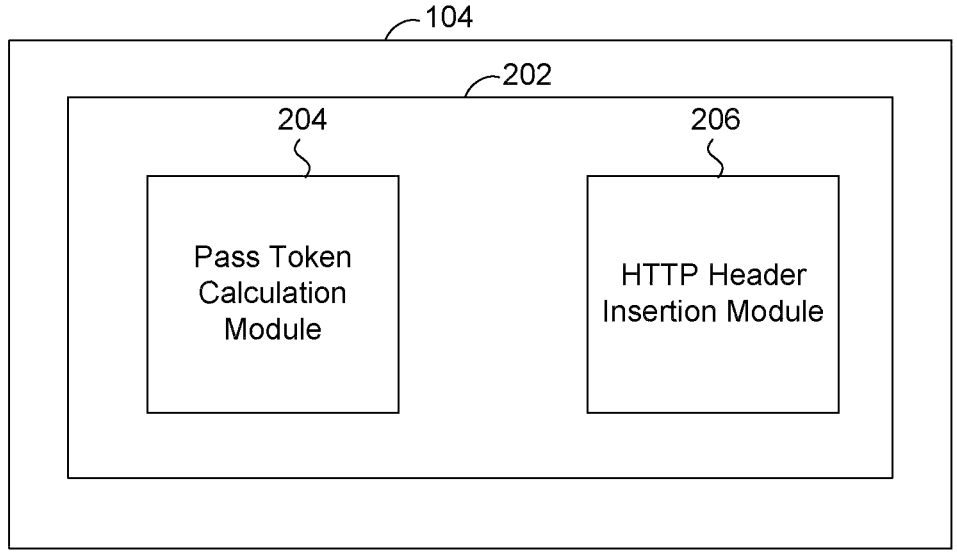
FIG. 2 is a block diagram showing Web threat protection components of end-point computer 104 in accordance with one embodiment.

FIG. 2 is a block diagram showing Web threat protection components of end-point computer 104 in accordance with one embodiment. Computer 104 may be any type of computing device capable of accessing the Internet. For example, it may be a desktop or laptop computer, including so-called netbooks, a tablet computing device, a "smart" phone or other type of mobile handset device, a mobile gaming device, an e-book reader, or any other type of Internet-enabled appliance or device. End-point device 104 has an anti-virus or anti-malware software application 202 that provides general anti-virus and Internet security protection to device 104. In one embodiment, anti-virus application 202 includes Web threat protection functionality implemented by two modules, a pass token calculation module 204 and an HTTP header insertion module 206. In other embodiments, the modules may be lightweight client components that work in conjunction with anti-virus application 202. Other modules may include an HTTP request filter and other modules in anti-virus program 202. The execution of these modules is described below.

Figure 3:
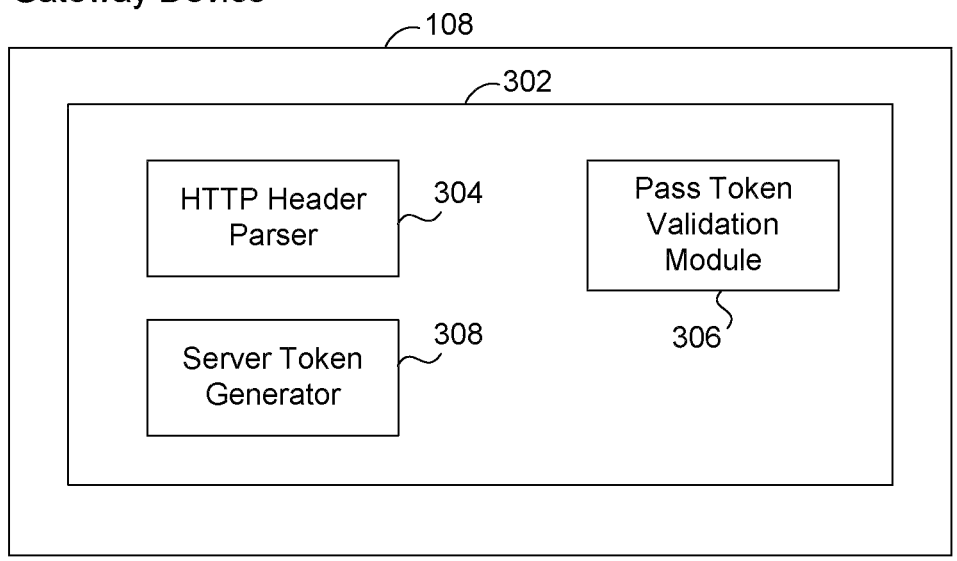
FIG. 3 is a block diagram showing Web threat protection components of a gateway device in accordance with one embodiment.

FIG. 3 is a block diagram showing Web threat protection components of gateway device 108 in accordance with one embodiment. As with end-point computer 104, gateway 108 has anti-virus software, shown as application 302, for providing malware protection generally for network 102. For example, it may include firewall applications, malware scanning, behavior monitoring, data leak prevention, and the like. In one embodiment, anti-virus software 302 has Web threat protection functionality and includes an HTTP header parser 304, a pass token validation module 306, and a server token generator 308. Parser 304 examines an HTTP header to see if a particular field is present. Module 306 is used to validate a pass token and module 308 is used to generate a server token. These modules execute in conjunction with modules 204 and 206 on end-point computer 104 to implement Web threat protection in network 102.

Figure 4:
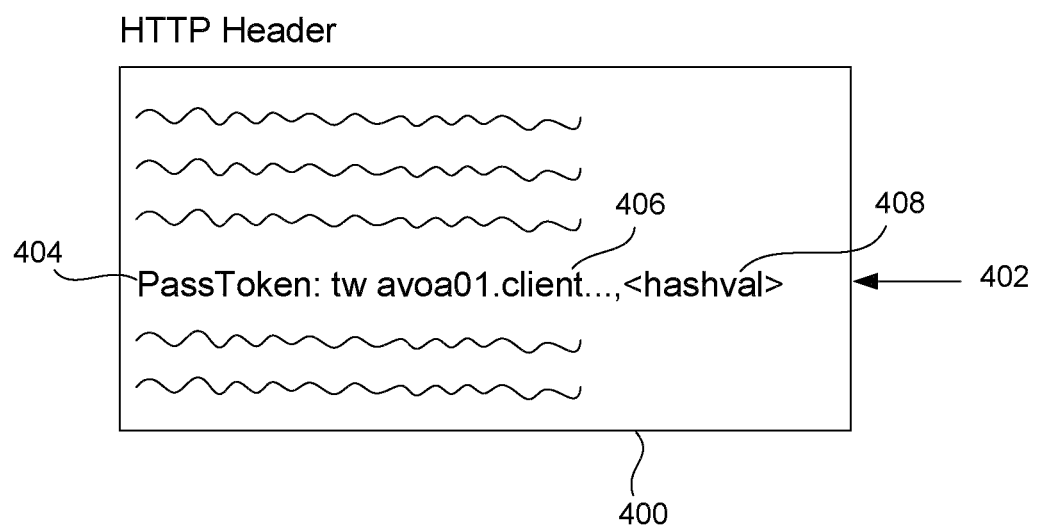
FIG. 4 is a block diagram of an HTTP request header modified to include specific data for implementing Web threat protection for an end-point computer in accordance with one embodiment.

FIG. 4 is a block diagram of an HTTP request header modified to include specific data for implementing Web threat protection for end-point computer 104 in accordance with one embodiment. A request to access a Web site either via a link or entering an address is typically implemented as an HTTP request which can be transmitted over the Internet using TCP/IP. An HTTP request has a header portion containing various standard fields. FIG. 4 shows an example of a header 400 having numerous fields. In one embodiment, one of the fields is a PassToken field 402. This field has a key name 404 of "PassToken" and a key name value 406 of "tw-avoa01.client.trendnet.org" which may be the name of an end-point server, such as server 106. Also included in field 402, in one embodiment, is a hash value of key name value 406. An example, "2b0af3dbd63 . . . ," is shown in field 402. The roles of key name value 406 and its hash value 408 are described below.

Figure 5:
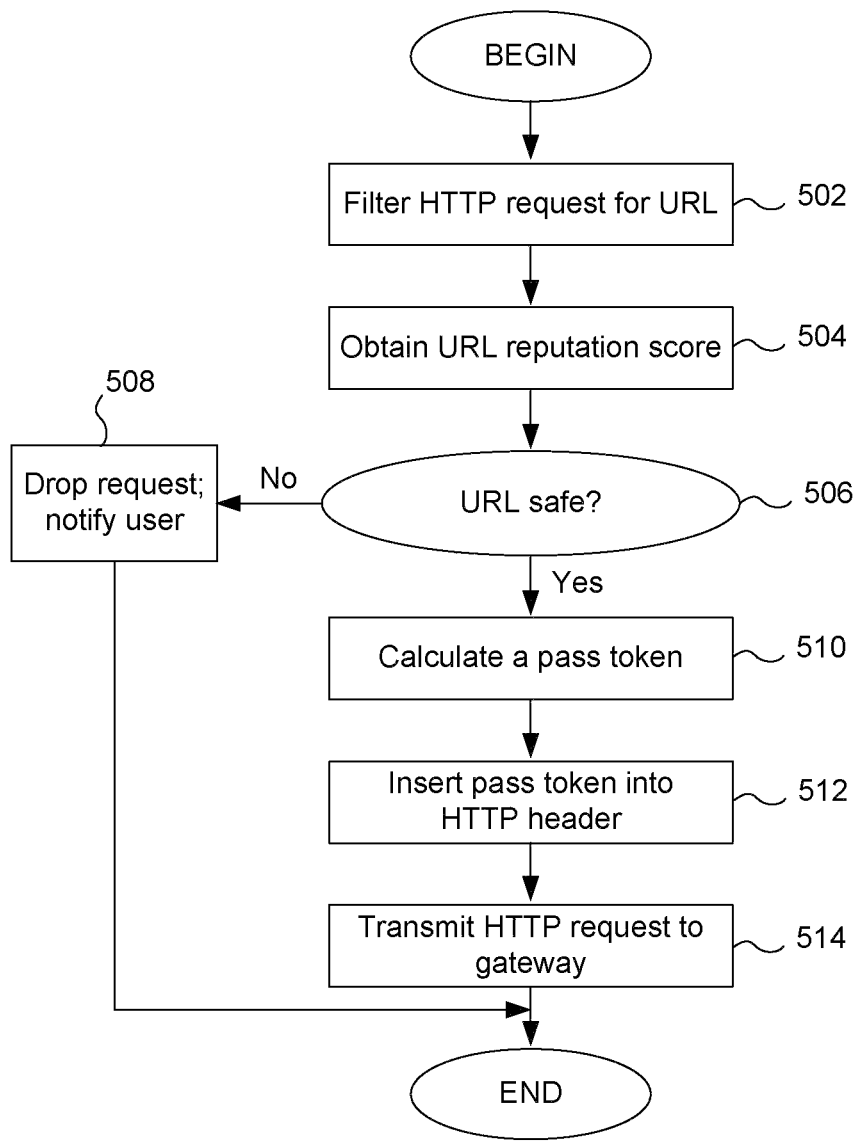
FIG. 5 is a flow diagram of a process for preparing and transmitting an HTTP request from an end-point computer in accordance with one embodiment.

FIG. 5 is a flow diagram of a process for preparing and transmitting an HTTP request from an end-point computer in accordance with one embodiment. The process begins with the end-point computer powered on and the user having entered a Web site address (i.e., a URL) in the browser or clicked on a link. In either case, an HTTP request is formed that contains one or more URLs, essentially pointers to specific Web site pages. For example, if a user types in a Web site address, such as www.cnn.com, the browser will typically go first to the home page for the site (which may have dozens of Web pages), which has a specific URL, often not "user friendly" and not used directly by visitors to the site (e.g., i.cdn.turner.com). This URL for the home page is embedded in the HTTP request. In another example, links in Web sites, e-mails, and so on, have an underlying URL which directs the browser to exactly where to go.

At step 502 the HTTP request is examined (e.g., filtered or parsed) to obtain one or more URLs embedded in the request. For ease of explanation, an HTTP request having one URL is used in the description. The same process can be employed for requests having multiple URLs. Techniques known in the art of HTTP programming and in Web threat protection can be used to filter the request to obtain the URL. In one embodiment, the filtering is performed by existing anti-virus software, such as software 202 in FIG. 2, which may have some type of Internet security functionality. Once the URL is filtered and isolated, at step 504 the computing device obtains data relating to the reputation of the URL indicating it overall safety, often referred to as a URL score or rating. This is done using known processes in the field. A URL rating request is formed by the anti-virus software and is transmitted to a domain (Web site) reputation database, such as database 114 in FIG. 1. Each URL maps to a score and if a Web site has multiple URLs, each URL may have a different score. The request may be transmitted to domain reputation database 114 via gateway device 108 which has a connection to Internet 110. The URL rating request may simply contain a text-string of the URL and the address of domain reputation database 114. Such databases are typically maintained and operated by anti-virus software providers or operating system software providers (e.g., Microsoft, Apple). As noted, domain reputation databases may have millions of records containing information on the level of safety of a large volume of Web sites. The URL rating request is transmitted to database 114 and receives a URL score in response. For example, a score may be a number between 1 and 100.

At step 506 anti-virus software 202 determines whether the URL score or rating indicates whether the URL is safe or potentially harmful. A score above a certain threshold may indicate that the URL is safe for the user to visit. Different organizations may have varying standards and thus may set different thresholds. In another example, the standard may be set by the anti-virus software provider and not alterable by the customer. In general, the service provider may give a URL a low rating if it has any history of malware or has, for any reason, a tarnished or questionable reputation or is suspected of propagating malware of any type. Such standards may vary from one provider to the next. In any case, if the anti-virus software considers the URL as not safe, control goes to step 508 where the HTTP request is dropped and the user is notified. Alternatively, the user may be given the option to go to the Web site anyway. Or more information on the site may be provided (domain reputation database 114 may contain detailed information on the URL that is returned to end-point computer 104 at step 504).

If the URL is determined to be safe by the anti-virus software, control goes to step 510 where a pass token is generated. This is done by pass token calculation module 204 shown in FIG. 2 and an example of which is shown in FIG. 4. A pass token is generated using a unique identifier of the end-point server that the end-point computer is connected to (e.g., server 106 and computer 104 in FIG. 1) and a specific hash calculation described below. The server name corresponds to key name value 406 shown in FIG. 4. The hash value is generated by applying a conventional hash function to the URL and a server token. The server token is a value that is resident on the end-point computer 104. It receives the token from its end-point server when the server is initially registered with the network. Each end-point computer that is connected to a particular end-point server has the same server token, which is unique to that particular end-point server. In one embodiment, the pass token consists of the server name or identifier (e.g., the name of the server's PKI certificate), followed by or concatenated with the hash value. Because the hash of the URL and the server token is unique, the pass token serves as a unique identifier. Another characteristic of the pass token is that it is unforgeable. That is, it cannot be generated by another entity, such as a malicious third-party. An entity must have the server token, the end-point server identifier, the URL, and the particular hash function. The generation of the pass token may also be described as lightweight and computationally simple (one of the advantages of using a hash function).

Once the pass token is generated, at step 512 it is inserted into the header of the HTTP request. This may be done by creating a new field in the header using conventional HTTP programming practices. In one embodiment, the new field may be called "PassToken" as shown in FIG. 4. The new field stores the name of the field, the end-point server ID of the end-point server (connected to the end-point computer) and the hash value. At step 514 the HTTP request, now with a modified header, is transmitted to a gateway device. As noted above, all HTTP requests from the end-point computer are sent through the gateway device. The gateway may be an interface of a router. The request to the domain reputation database server can be sent without being queried for a score because it is treated as a trusted site. A white list can also be configured in the end-point computer or in the gateway device to enable skipping the Web reputation check. At this stage the process of preparing the HTTP request and transmitting it from the end-point computer is complete.

Figure 6:
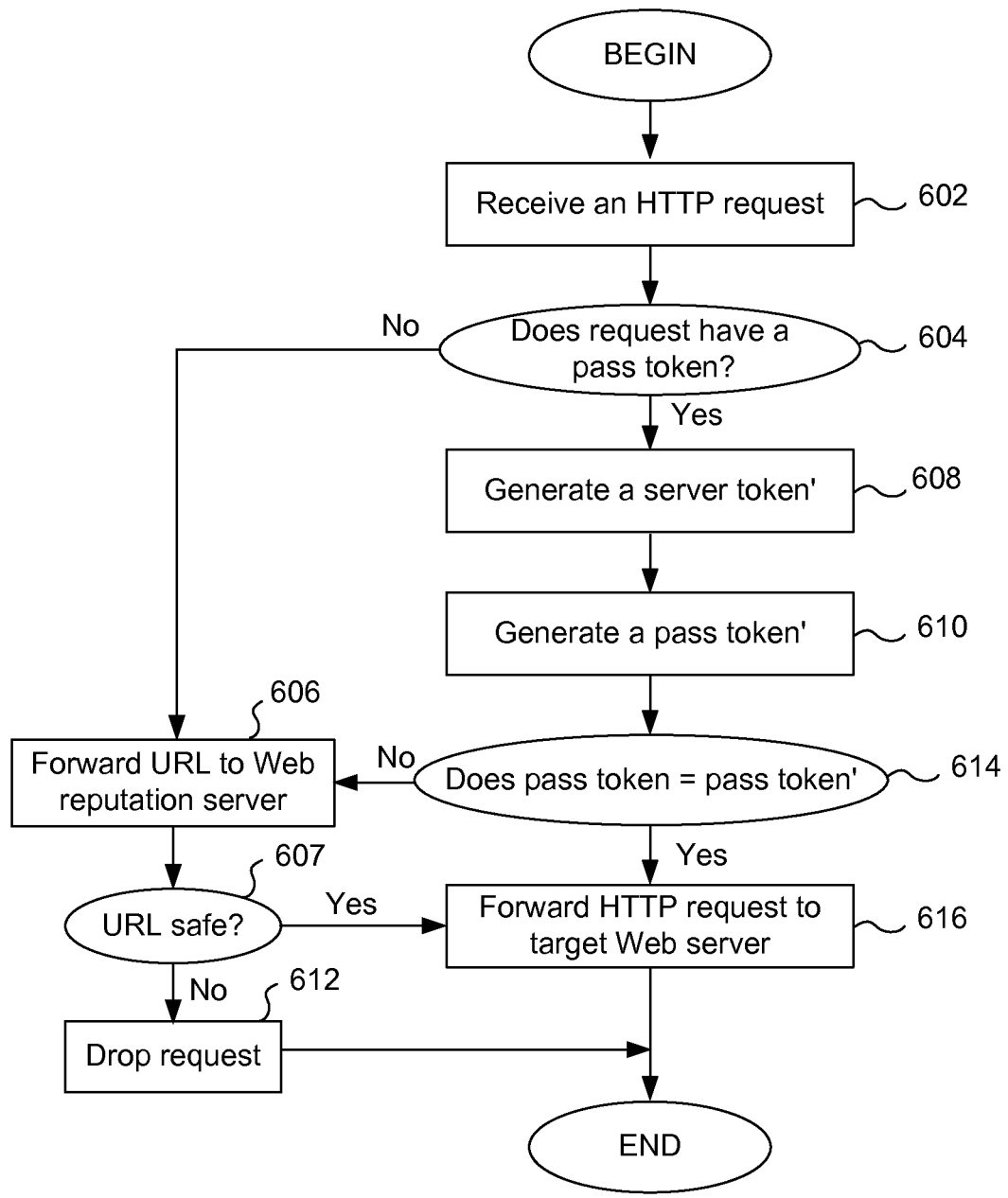
FIG. 6 is a flow diagram of a process for validating a pass token on a gateway device that receives an HTTP request from an end-point computer in accordance with one embodiment.

FIG. 6 is a flow diagram of a process for validating a pass token on a gateway device that receives an HTTP request from an end-point computer in accordance with one embodiment. A gateway device is a network computing component used to separate a network from external components or networks. Computers in a network are assigned a gateway and all component connections are made via a gateway first. By validating a pass token to ensuring it is authentic, the gateway device is able to confirm that the end-point computer actually performed a URL check and determined that it was safe to allow the HTTP request to be forwarded on to the target Web site. At step 602 the gateway device receives an HTTP request from an end-point computer or client computer. As noted above, the request is to visit a Web site, more specifically, a page at a Web site and download it on to the end-point computer. At step 604 the anti-virus program on the gateway device, such as application 302 in FIG. 3, determines whether the HTTP request header has a pass token field. This may be done by examining the header using conventional techniques. Names other than "Pass Token" may be used by the service provider. If it does, it indicates that the end-point computer inserted it after performing a URL reputation check and determining that the URL was safe, as described in FIG. 5. There would be no other reason to insert this new field and value. If the HTTP request does not have a pass token field, control goes to step 606 where the URL in the request is forwarded to the domain reputation database. In this case, the gateway device assumes that the end-point computer did not perform the URL check. However, as explained below, this does not mean that the HTTP request is automatically dropped.

If at step 604 it is determined that the request has a pass token, control goes to step 608 where the anti-virus software generates what is referred to as a validation server token (server token'). As described in FIG. 7 below, an original server token is generated by the gateway when an end-point server is added to the network (or newly registered to operate in the network). This original server token is also described briefly at step 510 where a pass token is generated. The validation server token is generated by applying a hash function to the combination of a secret value in the gateway device and an identifier of the end-point server (i.e., the server connected to the end-point computer from which the HTTP request was received). This validation server token is used to generate a validation pass token.

At step 610 a validation pass token (pass token') is calculated using the same components used to generate the original pass token on the end-point computer as described at step 510. As in step 510, an end-point server identifier is combined with the hash of a server token and a URL. The validation pass token is generated using the same components, except the validation server token is used instead of the original server token. If there is no tampering and all data items are authentic, the validation server token is the same as the original server token and the same will be true for the pass tokens.

This validation pass token is compared to the original pass token embedded in the HTTP request at step 614. If the tokens are not the same, the gateway device has determined that pass token in the HTTP request header is not authentic. The device cannot assume at this stage that the end-point computer performed a proper URL reputation check and control goes to step 606. As noted above, at step 606 the gateway device prepares a URL reputation check and transmits it to the domain reputation database. In another embodiment, it may also notify a system administrator or the user because it may be assumed that suspicious activity occurred with the original pass token. Once the URL reputation score is received at the gateway after step 606, at step 607 the gateway determines whether the URL is safe by comparing the score to a threshold score. The step is similar to the function performed at step 506 in FIG. 5 where the end-point computer checks the URL score.

If it determined that it is not safe, control goes to step 612 where the HTTP request is dropped or blocked in some manner to prevent a potential malware infection from the target Web site. If it is determined to be safe, control goes to step 616 where the HTTP request is forwarded to the target Web site. Thus, in one embodiment, the HTTP request can still be fulfilled even if the pass tokens do not match, but only after the gateway device has independently determined the reputation of the URL. In the case where the pass tokens do not match, a network or security administrator may be notified before the gateway performs a URL check (step 608).

Returning now to step 614, if the original pass token is the same as the validation pass token, control goes to step 616. In this case, the gateway device can assume that the end-point computer performed a URL check, that the URL was determined to be safe, and that the pass token indicating these two conditions has not been forged or tampered with. The manner in which the original pass token was generated on the end-point computer makes it nonforgeable. That is, the original pass token cannot be replicated or forged to match the validation pass token unless it was created by the end-point computer and the anti-virus application on the end-point computer will not generate a pass token unless the URL is determined to be safe. At this stage the pass token validation process on the gateway device is complete.

Figure 7:
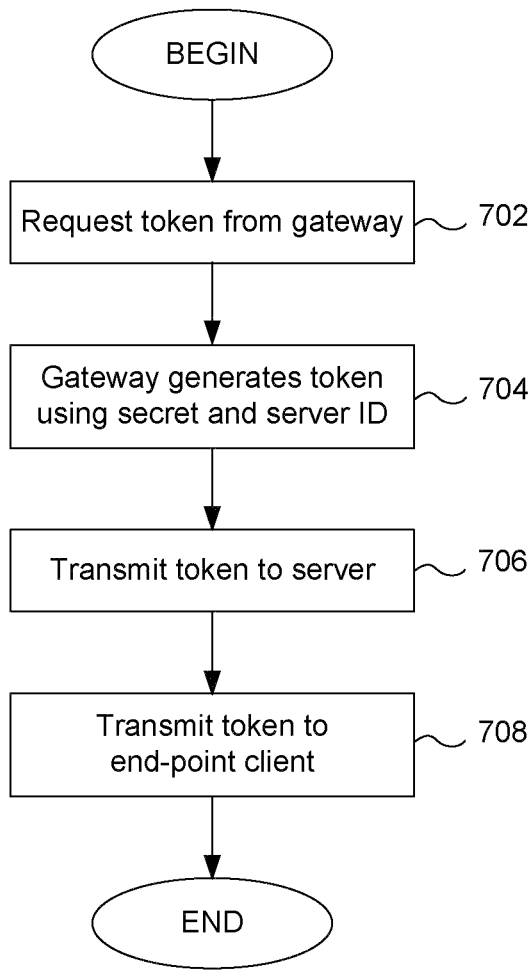
FIG. 7 is a flow diagram of a process of registering a new end-point server in a network having an end-point computer and a gateway device.

FIG. 7 is a flow diagram of a process of registering a new end-point server in a network having an end-point computer and a gateway device. As described above, each client computer having the efficient Web threat protection capability of the present invention has an associated end-point server which is also connected with a gateway device. The processes described in FIGS. 5 and 6 require that the end-point server have a server token and a server identifier (such as the server's certificate ID). It may be assumed that all servers will have a server ID, however, they do not come with a server token as described above; one must be generated for them.

At step 702, the anti-virus software on the new end-point server transmits a request for a server token to the gateway device. This is done when the server is initially connected and registered with the network. The anti-virus software on the server has the intelligence to make this request before it can allow the server to begin normal operations in the network (unless overridden by a network or system administrator). The server token request contains the server ID and is sent using an SSL connection between the server and the gateway. The SSL connection provides protection against tampering and from so-called "man-in-the-middle" attacks. At step 704 the gateway device receives the token request and generates a server token using the server ID and a secret value on the gateway device ("gateway secret"). A gateway secret is a value stored inside the gateway product and is unique for each gateway. It is unpredictable and kept secret. For example, it may be a random number generated within the gateway device. For example, b3c798a566ec20b4 is a 256-bit random secret number in hexadecimal. It is only used for generating a server token. A server token may be generated using the server ID and the gateway secret by using a table of servers and server IDs. For example, a server with the name tw-avoa01 is mapped to ID 1007 (0x03ef in hexadecimal) and another server tw-osce503 is mapped to ID 4798. If the gateway wants to generate a server token for tw-avoa01, it can compute a hash code of 0xb3c798a566ec20b400000000000003ef (the first 256 bits is the gateway secret and the last 256 bits are the server ID. Another 256-bit value, for example, 0x28e9ac5ab9d1379f may be the server token.

At step 706 the new server token is transmitted to the server using an SSL connection initialized by the gateway device to the end-point serer. This is to ensure that the server token is sent to the correct server; that is, to the server that was identified in the server token request, and to ensure that it is not corrupted or intercepted by third parties during transmission. The authenticity of the server token is important in generating and validating pass tokens. At step 708 the server transmits the server token to all end-point computers that are connected with the server. The client computers use the server token in generating a pass token as described in step 510. The process of generating a server token when a new server is added and transmitting is not as lightweight a process as validating a pass token. This is primarily because establishing an SSL connection is a relatively resource-intensive task. However, this process is only done when a new server is registered in the network. At this stage the process of registering the end-point server in the network is complete.

Figure 8A:
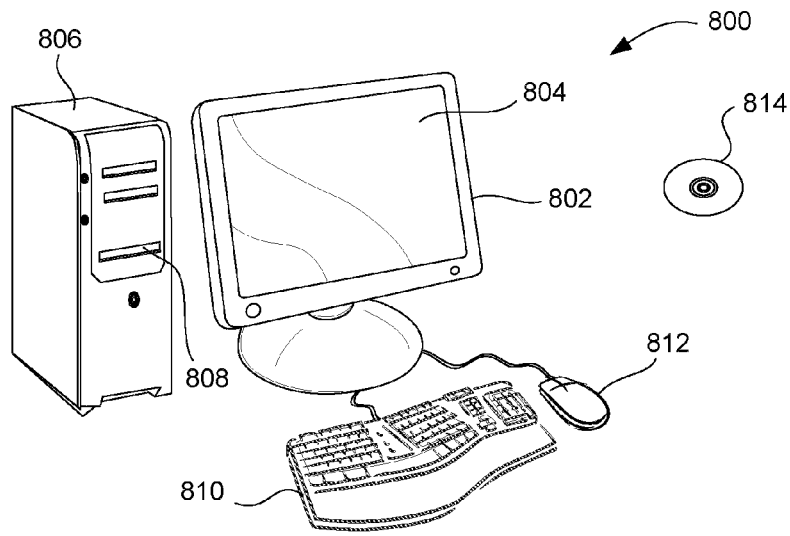
FIGS. 8A and 8B are block diagrams of a computer system suitable for implementing embodiments of the present invention.
Figure 8B:
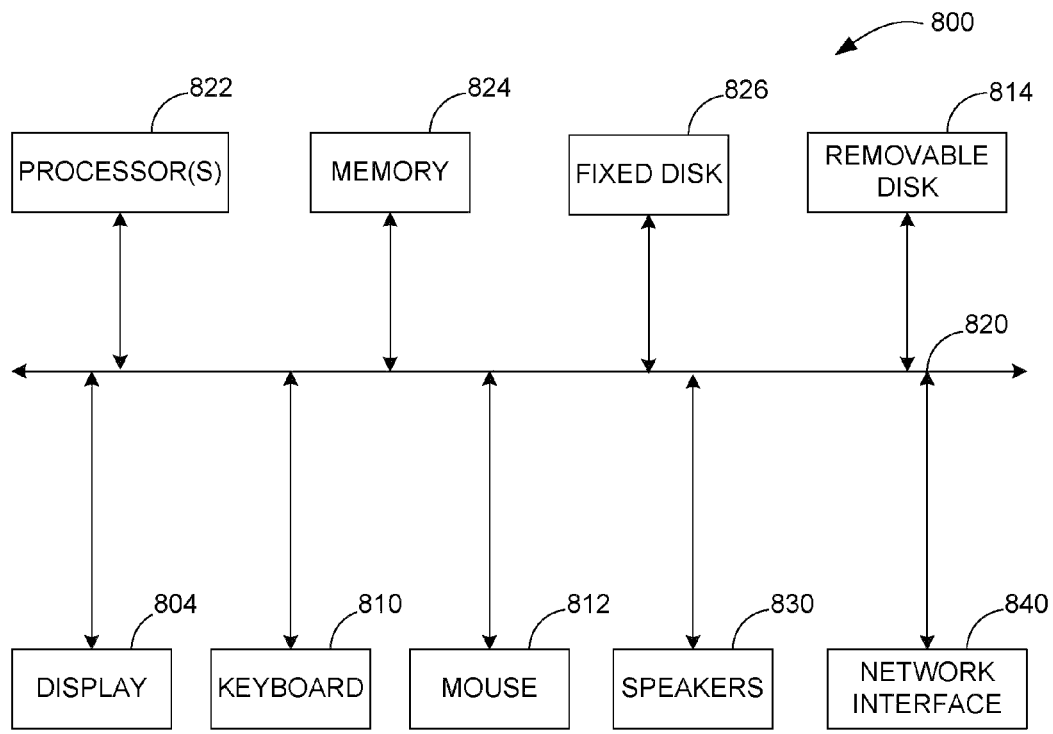

FIGS. 8A and 8B are diagrams of a computer system 800 suitable for implementing embodiments of the present invention. FIG. 8A shows one possible physical form of a computer system or computer as described above. Of course, the computer system may have many physical forms including an integrated circuit, a printed circuit board, a small handheld device (such as a mobile telephone, handset or PDA), a personal computer, a server computer, a laptop or netbook computer, or a super computer. Computer system 800 includes a monitor 802, a display 804, a housing 806, a disk drive 808, a keyboard 810 and a mouse 812. Disk 814 is a computer-readable medium used to transfer data to and from computer system 800.

FIG. 8B is an example of a block diagram for computer system 800. Attached to system bus 820 are a wide variety of subsystems. Processor(s) 822 (also referred to as central processing units, or CPUs) are coupled to storage devices including memory 824. Memory 824 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 826 is also coupled bi-directionally to CPU 822; it provides additional data storage capacity and may also include any of the computer-readable media described below. Fixed disk 826 may be used to store programs, data and the like and is typically a secondary storage medium (such as a hard disk) that is slower than primary storage. It will be appreciated that the information retained within fixed disk 826, may, in appropriate cases, be incorporated in standard fashion as virtual memory in memory 824.

CPU 822 is also coupled to a variety of input/output devices such as display 804, keyboard 810, mouse 812 and speakers 830. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 822 optionally may be coupled to another computer or telecommunications network using network interface 840. With such a network interface, it is contemplated that the CPU might receive information from the network, or might output information to the network in the course of performing the above-described method steps. Furthermore, method embodiments of the present invention may execute solely upon CPU 822 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What is claimed is:

1. A method of protecting a computing device from a Web threat, the method comprising:
    identifying a URL in an HTTP request at said computing device;
    obtaining a URL reputation data value over the Internet from a reputation database;
    determining whether the reputation data value indicates that the URL is safe;
    calculating a pass token at said computing device;
    inserting the pass token into the HTTP request at said computing device after the determining operation, thereby creating a modified HTTP request wherein the pass token indicates that the URL is safe; and
    transmitting the modified HTTP request to a gateway device in a private network that includes the computing device.

2. A method as recited in claim 1 further comprising:
    filtering the HTTP request.

3. A method as recited in claim 1 further comprising:
    transmitting the URL to a domain reputation server; and
    receiving a URL reputation data value.

4. A method as recited in claim 1 wherein calculating a pass token further comprises:
    utilizing a server name of a server connected to the computing device in the private network, the URL, and a server token resident on the computing device and received from the server.

5. A method as recited in claim 4 further comprising:
    applying a hash function to the URL and the server token.

6. A method as recited in claim 5 further comprising:
    combining the server name and the hash value of both the URL and the server token.

7. A method as recited in claim 1 wherein the pass token is inserted into a pass token field in the header of the HTTP request.

8. A method as recited in claim 1 wherein inserting the pass token is transparent to a user and does not impact normal HTTP transactions.

9. A method of protecting a client computer against a Web threat, the client computer connected to a gateway device, the method comprising:
    receiving from the client computer at the gateway device, an HTTP request having a first pass token;
    obtaining the first pass token from the HTTP request;
    creating a second pass token;
    determining whether the first pass token is valid by comparing the first pass token with the second pass token; and
    if the first pass token is equal to the second pass token, transmitting the HTTP request to a target Web server.

10. A method as recited in claim 9 further comprising:
    obtaining the server name from the first pass token.

11. A method as recited in claim 10 further comprises:
    generating a validation token using a gateway secret and the server name.

12. A method as recited in claim 11 wherein creating the second pass token further comprises:
    applying a hash function to the validation token and a URL, wherein the URL is contained in the HTTP request and the hash function results in a hash value.

13. A method as recited in claim 12 further comprising:
    combining the hash value with the server name.

14. A method as recited in claim 9 further comprising:
    if the first pass token is not equal to the second pass token, transmitting the URL to a domain reputation server.

15. A method as recited in claim 1 wherein obtaining the first pass token further comprises:
    parsing the HTTP request.

16. A method of adding a new server to a network having a client computer and a gateway device, the network capable of protecting the client computer against a Web threat, the method comprising:
    receiving, at the gateway device, a request for a token from the new server, the request containing a new server identifier (ID);
    creating the token on the gateway device using a gateway secret and the new server ID;
    transmitting the token from the gateway device to the new server; and
    transmitting the token to the client computer in the network, wherein the token is used to generate a pass token for insertion into an HTTP request when a URL reputation check has been performed.

17. A method recited in claim 16 wherein creating the token on the gateway device further comprises:
    applying a hash function to the gateway secret and the new server ID.

18. A method as recited in claim 16 wherein the gateway secret is a random number generated in the gateway device and is stored in the gateway device.

19. A method as recited in claim 16 wherein the gateway secret is used only for creating the token.

20. A method as recited in claim 16 wherein the request is sent over a first SSL connection and the token is transmitted to the new server using a second SSL connection.

21. A method of protecting a client computer from a Web threat, the client computer being in a private network together with a gateway device and a newly added server, the method comprising:

registering the newly added server on the private network, the registering operation comprising:
  receiving, at the gateway device, a request for a server token from the newly added server, the request containing a new server identifier (ID);
  creating the server token on the gateway device using a gateway secret and the new server ID, the gateway secret being a unique value that is stored in the gateway device;
  transmitting the server token from the gateway device to the server; and
  transmitting the server token from the server to the client computer in the network;

preparing and transmitting an HTTP request from the client computer to the gateway device, the HTTP request containing a first pass token indicating that the URL is safe, the preparing and transmitting operation comprising:
  identifying a URL in an HTTP request at the client computer, the HTTP request being based on a request from a user of the client device to visit a web site represented by the URL;
  obtaining a URL reputation data value over the Internet from a reputation database at the client computer;
  determining whether the reputation data value indicates that the URL is safe;
  calculating the first pass token at said computing computer using the server token received from the server in the private network, the first pass token indicating that the URL is safe;
  inserting the first pass token into the HTTP request at said client computer after said determining operation, thereby creating a modified HTTP request; and
  transmitting the modified HTTP request to the gateway device in the private network; and validating the first pass token from the client computer at the gateway device, the validating operation comprising:
  receiving from the client computer at the gateway device, the HTTP request having the first pass token;
  obtaining the first pass token from the HTTP request;
  creating a second pass token at the gateway device using the new server ID and the gateway secret;
  determining whether the first pass token is valid by comparing the first pass token with the second pass token; and
  if the first pass token is equal to the second pass token, transmitting the HTTP request to a target Web server.

* * * * *